US012633611B2

(12) United States Patent
Petrovic et al.

(10) Patent No.: US 12,633,611 B2
(45) Date of Patent: May 19, 2026

(54) SYSTEM AND METHOD TO CONNECT AND DISCONNECT ONE OR MORE LITHIUM-ION BATTERY

(71) Applicant: SCHNEIDER ELECTRIC IT CORPORATION, Foxboro, MA (US)

(72) Inventors: Luka Petrovic, North Billerica, MA (US); Andrew Chase, Acton, MA (US); Jeffrey Steven Young, Billerica, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 356 days.

(21) Appl. No.: 18/210,319

(22) Filed: Jun. 15, 2023

(65) Prior Publication Data

US 2024/0421409 A1 Dec. 19, 2024

(51) Int. Cl.
H01M 50/262 (2021.01)
H02J 9/06 (2006.01)

(52) U.S. Cl.
CPC ........... H01M 50/262 (2021.01); H02J 9/062 (2013.01)

(58) Field of Classification Search
CPC .............................. H01M 50/262; H02J 9/062
USPC .......................................................... 307/85
See application file for complete search history.

(56) References Cited

U.S. PATENT DOCUMENTS

2018/0328998 A1* 11/2018 Zhang ................ G01R 31/3842
2021/0135462 A1* 5/2021 Sampson .............. H02J 7/0042

FOREIGN PATENT DOCUMENTS

CN 105576725 * 5/2016
CN 110635304 B 4/2022
WO WO2015040655 * 3/2015

* cited by examiner

*Primary Examiner* — Richard Tan
(74) *Attorney, Agent, or Firm* — FIG. 1 Patents

(57) ABSTRACT

A power system includes an external-battery-power terminal configured to receive an external-battery-power connector, an external battery emergency power off (EPO) terminal, and an EPO switch coupled to the EPO terminal. The EPO switch is configured to be triggered by decoupling a mechanical latch associated with the external-battery-power connector. An EPO signal is manipulated when the EPO switch is triggered to decouple a battery from the external-battery-power terminal.

23 Claims, 4 Drawing Sheets

SYSTEM AND METHOD TO CONNECT AND DISCONNECT ONE OR MORE LITHIUM-ION BATTERY

BACKGROUND OF DISCLOSURE

1. Field of Disclosure

This disclosure is directed to uninterruptible power supplies (UPSs) and batteries, such as lithium-ion batteries, used to provide back-up power to UPSs, and more particularly to systems and methods used to connect and disconnect such batteries.

2. Discussion of Related Art

Many power devices, including UPSs, employ extra batteries, including lithium-ion batteries, which are connected to the UPSs by electrical (battery) connectors to transfer power and signal from the UPSs to and from the batteries to extend the run time of the UPSs.

If a user attempts to disconnect an external battery connector from a power system, such as a UPS, especially while high current is being provided to or from the battery, electrical arcing may occur, which can result in damage to the connector. Connectors are designed to resist arcing when connecting and disconnecting the battery, which for high current connectors may result in larger, more expensive connectors.

SUMMARY OF THE DISCLOSURE

One aspect of the present disclosure is directed to a power system comprising an external-battery-power terminal configured to receive an external-battery-power connector, an external battery emergency power off (EPO) terminal, and an EPO switch coupled to the EPO terminal. The EPO switch is configured to be triggered by decoupling a mechanical latch associated with the external-battery-power connector. An EPO signal is manipulated when the EPO switch is triggered to decouple a battery from the external-battery-power terminal.

One embodiment of the power system is directed to configuring the external-battery-power terminal to be coupled to the battery. The battery may be a lithium-ion battery. The power system further may include a battery management system including a microprocessor configured to control the operation of a switch to decouple the battery from the external-battery-power terminal. The microprocessor, in response to the EPO signal, may be configured to control the switch to decouple the battery from the external-battery-power terminal. The external-battery-power terminal may be part of a battery-power connector and may be configured to releasably mate with the external-battery-power connector. The external-battery-power terminal may include a positive terminal and a negative terminal, which are configured to connect with terminals provided in the battery-power connector to provide power from the power system. The external-battery-power terminal may be coupled to the battery by at least one power bus. The at least one power bus may be coupled to a switch to decouple a battery from the external-battery-power terminal. The switch may be normally in an ON position thereby connecting the battery to the external-battery-power terminal. The EPO switch may be configured to be moved from an ON position to an OFF position by decoupling the mechanical latch to terminate the EPO signal to a microprocessor of a battery module. The power system of claim 1, wherein the mechanical latch includes a hand actuated fastener configured to be extended to engage the EPO switch to achieve an ON position and retracted to disengage the EPO switch to achieve an OFF position. The power system further may include one or more battery frames coupled to the power system, with the one or more battery frames being configured to provide additional power to the power system. Each battery frame of the one or more battery frames may be coupled to the external-battery-power terminal, with each battery frame including a battery frame connector configured to mate with an external-battery-frame-power connector and a battery frame EPO switch coupled to a battery frame EPO terminal, and the battery frame EPO terminal being coupled to the EPO terminal. The battery frame EPO switch may be configured to be triggered by decoupling a mechanical latch associated with the external-battery-frame-power connector. The battery frame EPO terminal may terminate a battery frame EPO signal when the battery frame EPO switch is triggered to decouple a battery of the battery frame from the external-battery-power terminal. In response to the battery frame EPO signal, the battery frame module may be configured to decouple the battery frame from the external-battery-power terminal. The EPO signal may be discontinued when the EPO switch is triggered. The external-battery-power terminal and the EPO terminal may be part of a battery power connector.

Another aspect of the present disclosure is directed to a computer-readable medium storing instructions that, when executed by a controller, cause the controller it to perform a method of decoupling a battery from an external-battery power terminal. In one embodiment, the method comprises: coupling an external-battery-power connector to an external-battery-power terminal; coupling an emergency power off (EPO) switch to an external battery EPO terminal; and in response to a decoupling of a mechanical latch associated with the external-battery-power connector, triggering the EPO switch to decouple a battery from the external-battery-power terminal.

Embodiments of the computer-readable medium further may include controlling an operation of a switch by a microprocessor to decouple the battery from the external-battery-power terminal. The switch may be normally in an ON position thereby connecting the battery to the external-battery-power terminal. The external-battery-power terminal may be part of a battery-power connector and may be configured to releasably mate with the external-battery-power connector. The external-battery-power terminal may include a positive terminal and a negative terminal, which are configured to connect with terminals provided in the battery-power connector to provide power from the power system. The EPO switch may be configured to be moved from an ON position to an OFF position by decoupling the mechanical latch to terminate the EPO signal to a microprocessor of a battery module.

Yet another aspect of the present disclosure is directed to a battery frame comprising an external-battery-frame-power terminal configured to receive an external-battery-frame-power connector, an external battery frame emergency power off (EPO) terminal, and a battery frame EPO switch coupled to the battery frame EPO terminal. The battery frame EPO switch is configured to be triggered by decoupling a mechanical latch associated with the external-battery-frame-power connector. An EPO signal is manipulated when the EPO switch is triggered to decouple a downstream battery from a power system.

Embodiments of the battery frame further may include at least one battery module coupled to the external-battery-frame-power terminal and the battery frame EPO switch. The battery frame, in response to an EPO signal being discontinued, may be configured to disconnect at least one battery of the at least one battery module from the external-battery-frame power terminal. The battery frame further may include a lithium-ion battery. The external-battery-frame-power terminal may be part of a battery frame connector and may be configured to releasably mate with the external-battery-frame-power connector. The external-battery-frame-power terminal may include a positive terminal and a negative terminal, which are configured to connect with terminals provided in the battery frame connector to provide power to the power system. The external-battery-frame-power terminal may be coupled to the power system by at least one power bus. The EPO switch may be configured to be moved from an ON position to an OFF position by decoupling the mechanical latch to terminate the EPO signal. The mechanical latch may include a hand actuated fastener configured to be extended to engage the battery frame EPO switch to achieve an ON position and retracted to disengage the battery frame EPO switch to achieve an OFF position. The battery frame further may include at least one additional battery frame coupled to the battery frame. The at least one additional battery frame further may include an additional battery frame connector configured to mate with an additional external-battery-frame-power connector and an additional battery frame EPO switch coupled to an additional battery frame EPO terminal. The additional battery frame EPO switch may be configured to be triggered by decoupling a mechanical latch associated with the additional external-battery-frame-power connector. The additional battery frame EPO terminal may terminate a battery frame EPO signal when the additional battery frame EPO switch is triggered to decouple a battery of the additional battery frame from the external battery-power terminal. In response to the additional battery frame EPO signal, the one or more additional battery frame modules is configured to decouple to the additional external battery-power terminal from the power source.

Another aspect of the present disclosure is directed to a computer-readable medium storing instructions that, when executed by a controller, cause the controller it to perform a method of decoupling a downstream battery from a power system. In one embodiment, the method comprises: coupling an external-battery-frame-power connector to an external-battery-frame-power terminal; coupling a battery frame emergency power off (EPO) switch to an external battery frame EPO terminal; and in response to a decoupling of a mechanical latch associated with the external-battery-power connector, triggering the battery frame EPO switch to decouple a downstream battery from a power system.

Embodiments of the computer-readable medium further may include, in response to an EPO signal being discontinued, disconnecting at least one battery of the at least one battery module from the external-battery-frame power terminal. The external-battery-frame-power terminal may include a positive terminal and a negative terminal, which are configured to connect with terminals provided in the battery frame connector to provide power to the power system. Triggering the battery frame EPO switch to decouple a downstream battery from a power system may include moving the EPO switch from an ON position to an OFF position to terminate the EPO signal. The computer-readable medium of claim 15, further comprising coupling at least one additional battery frame to the battery frame. The at least one additional battery frame further may include an additional battery frame connector configured to mate with an additional external-battery-frame-power connector and an additional battery frame EPO switch coupled to an additional battery frame EPO terminal. The additional battery frame EPO switch may be configured to be triggered by decoupling a mechanical latch associated with the additional external-battery-frame-power connector. The additional battery frame EPO terminal terminates a battery frame EPO signal when the additional battery frame EPO switch may be triggered to decouple a battery of the additional battery frame from the external battery-power terminal.

Another aspect of the present disclosure is directed to a battery module comprising a microprocessor coupled to an emergency power off (EPO) terminal. The battery module is configured to receive an EPO signal from an upstream device coupled to an EPO switch. The microprocessor is configured to control a switch to decouple at least one battery of the battery module from the upstream device upon a change in the EPO signal.

Embodiments of the battery module further may include coupling the upstream device to an external-battery-power terminal, which is configured to receive an external battery-power connector. The external-battery-power terminal may be part of a battery-power connector and may be configured to releasably mate with the external battery-power connector. The external-battery-power terminal may include a positive terminal and a negative terminal, which are configured to connect with terminals provided in the battery-power connector. The at least one battery may be coupled to the external-battery-power terminal. The at least one battery may be a lithium-ion battery. The microprocessor, in response to a change in the EPO signal, may be configured control the switch to decouple the battery from the external-battery-power terminal. The EPO switch may be configured to be moved from an ON position to an OFF position by a mechanical latch to terminate the EPO signal to the micro-processor. The battery module further may include a logic power supply coupled to the external-battery-power terminal; the logic power supply being configured to supply power to the microprocessor. The at least one battery may include a lithium-ion module having at least one lithium-ion battery cell.

Another aspect of the present disclosure is directed to a computer-readable medium storing instructions that, when executed by a controller, cause the controller it to perform a method of decoupling at least one battery from an upstream device. In one embodiment, the method comprises: coupling a microprocessor to an emergency power off (EPO) terminal; configuring a battery module to receive an EPO signal from an upstream device coupled to an EPO switch; and controlling a switch with the microprocessor to control a switch to decouple at least one battery of the battery module from the upstream device upon a change in the EPO signal.

Embodiments of the computer-readable medium further may include coupling the upstream device to an external-battery-power terminal, which is configured to receive an external battery-power connector. The external-battery-power terminal may be part of a battery-power connector and may be configured to releasably mate with the external battery-power connector. The external-battery-power terminal may include a positive terminal and a negative terminal, which are configured to connect with terminals provided in the battery-power connector. The at least one battery may be coupled to the external-battery-power terminal. The at least one battery may be a lithium-ion battery. The computer-readable medium, in response to a change in the EPO signal, may control the switch with the microprocessor to decouple the battery from the external-battery-power terminal. The computer-readable medium further may include moving the EPO switch from an ON position to an OFF position by a mechanical latch to terminate the EPO signal to the micro-processor. The computer-readable medium further may include supplying power to the microprocessor by a logic power supply coupled to the external-battery-power termi-nal. The at least one battery may include a lithium-ion module having at least one lithium-ion battery cell.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE DISCLOSURE

Figure 1:
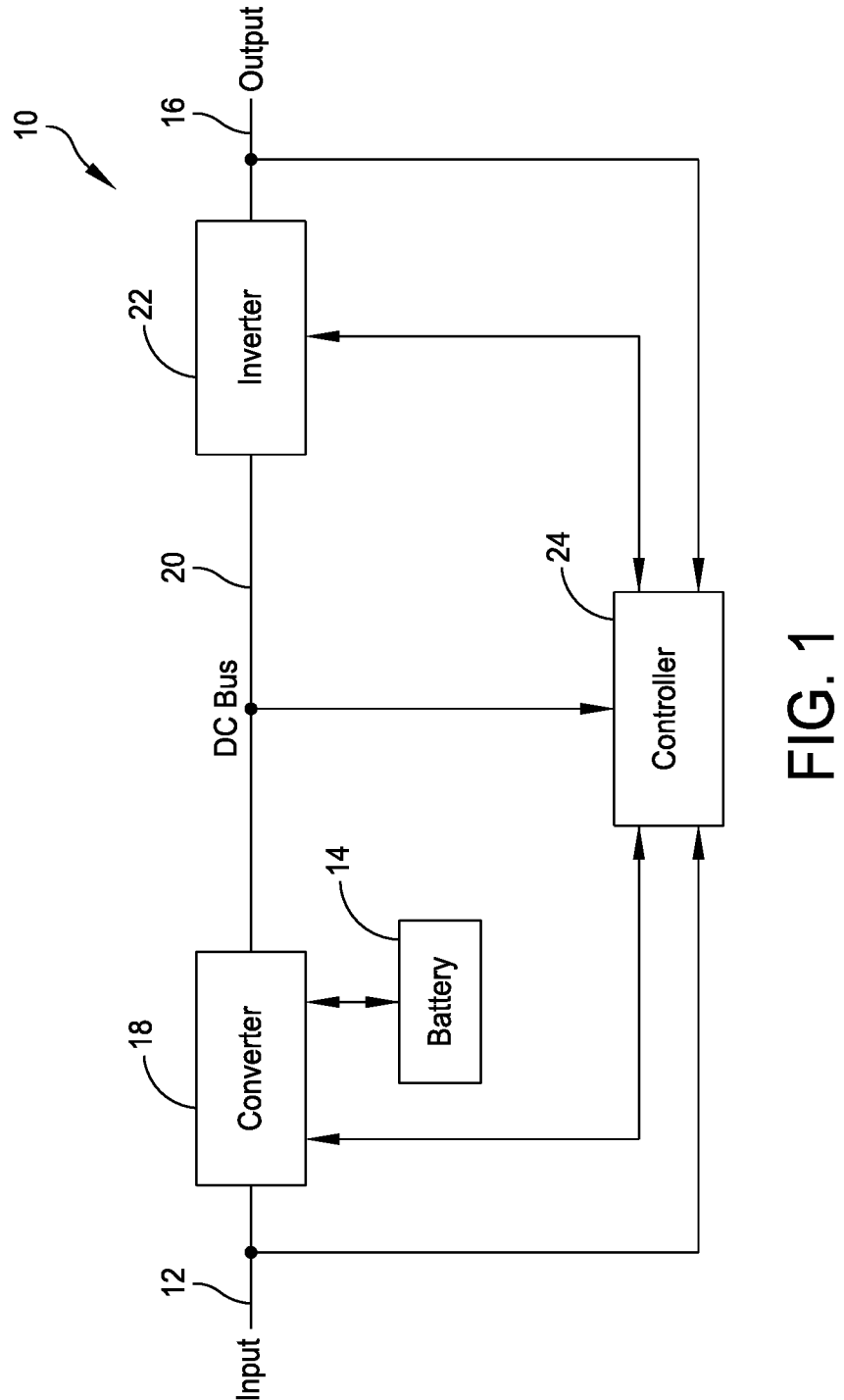
FIG. 1 is a block diagram of an exemplary UPS.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for description purposes and should not be regarded as limiting. The use of "including," "comprising," "having," "containing," "involving," and variations herein, are meant to be open-ended, i.e. "including but not limited to."

Embodiments of the present disclosure are directed to systems and methods to disconnect a battery, such as a lithium-ion battery, from an electronic device, including but not limited to a power device, such as a UPS. Embodiments of the present disclosure are applicable to lithium-ion bat-teries and other "smart batteries," which may include a microprocessor and power devices (called power discon-nect) controlled by the microprocessor to open charging and discharging power path to the battery and disconnect the battery from other batteries.

In some embodiments, the battery includes power and other communication and control signals, as well as an additional signal, sometimes referred to as "emergency power off" (EPO) signal. The additional EPO signal may be necessary to safely disconnect the battery and to facilitate the removal of the battery or downstream batteries, which may result in very quick battery shutdown and opening of power disconnect and stopping current to and from the battery.

In some embodiments, the battery further is configured so that the EPO signal is created by a small EPO switch, which is engaged by mechanical latch mechanism. For the battery to be operational after mechanical insertion, a mechanical latch is first engaged to close the EPO switch and to provide the EPO signal from the system to the battery. When mechanical latch is engaged, the battery cannot be physi-cally removed from the electronic device.

To disconnect and remove the battery and to prevent disconnect of the connector under the current and potential arcing and connector damage, the mechanical latch is unlatched. The movement of the mechanical latch to the unlatched position terminates or otherwise changes the EPO signal, thereby opening a switch to disconnect the battery from the power system. This results in battery shutdown and the cessation of all discharge or charge current into battery before user can physically pull mechanical battery connector and battery, and in the mechanical disconnection of the battery without any current to interrupt and prevents any potential arcing.

In some embodiments, the system may include mechani-cal connectors provided to connect large numbers of batter-ies in battery frames, sometimes referred to as "frame connectors," with the system or other battery frames. Each battery connection that connects groups of batteries in the battery frame and the power system or connects other battery frames (frame connectors) to the battery frame, includes a small EPO switch to generate an EPO signal and a mechanical latch for the frame connector. When the frame connector is engaged, the user closes the latch to mechani-cally secure the battery in place and to depress the EPO switch to generate the EPO signal thereby providing a connection between downstream batteries and the battery frame and/or the power system. Again, this mechanical latch prevents physical removing of the frame connector until the mechanical latch is removed and the EPO switch in the frame connector is opened.

Embodiments of the present disclosure are directed to a power system with an emergency power off (EPO) terminal, an EPO switch, and an external battery power terminal configured to receive an external battery power connector. The EPO switch is triggered when the connector is discon-nected, thereby causing the EPO terminal to terminate or otherwise changes an EPO signal.

In some embodiments, a mechanism to disconnect an external battery power cable from a power system, such as a UPS, may require an EPO switch to be depressed at least a few milliseconds before the connector can be discon-nected.

In some embodiments, depressing the EPO switch may cause all downstream batteries to stop drawing or supplying current.

In some embodiments, during a delay between releasing the EPO switch and the disconnection of the power cable, current through the cable may drop to zero.

Thus, it should be observed that systems and methods disclosed herein prevent disconnect of the connector under current and potential arcing and connector damage, thereby allowing certification testing to pass, while being able to use a smaller and less expensive connector.

Power devices, such as UPSs, provide regulated, uninter-rupted power for sensitive and/or critical loads, such as computer systems and other data processing systems. Known types of UPSs include on-line UPSs, off-line UPSs, line interactive UPSs, as well as others. On-line UPSs provide conditioned AC power as well as back-up AC power upon interruption of a primary source of AC power. Off-line UPSs do not provide conditioning of input AC power but do provide backup AC power upon interruption of the primary AC power source. Line interactive UPSs are similar to off-line UPSs in that they switch battery power when a blackout occurs but also include a voltage regulation mechanism, including but not limited to a multi-tap transformer to regulate the output voltage provided by the UPS.

Referring to the drawings, and more particularly to FIG. 1, an on-line UPS, generally indicated at 10, provides regulated power from input AC power received at input 12, as well as back-up DC power from a backup power source 14, e.g., a battery, to an output 16. The UPS 10 can be configured to provide output AC power that is voltage and frequency independent from the input AC power. In some examples, the backup power source 14 may be included in the UPS 10; however, in other examples, the backup power source 14 may be external to the UPS 10, and in certain examples include one or more lithium-ion batteries. The UPS 10 includes a converter 18, a DC bus 20, an inverter 22, and a controller 24 to control the converter 18 and the inverter 22. The DC bus 20 is coupled between the converter 18 and the inverter 22.

The input 12 is configured to receive input AC power having an input voltage level from an AC power source. The controller 24 monitors the input AC power received by the input 12 and is configured to operate the UPS 10 in different modes of operation based on the status of the input AC power received by the input 12. When AC power provided to the input 12 is acceptable, i.e., above an input power quality threshold, the controller 24 operates the UPS 10 in an on-line mode of operation.

In the on-line mode of operation, AC power from the input 12 is provided to the converter 18. The controller 24 operates the converter 18 to convert the AC power into DC power and to provide the DC power to the DC bus 20. DC power from the DC bus 20 is provided to the inverter 22. In addition, DC power from the DC bus 20 may be provided to the battery 14 for charging, either directly from the converter 18 or via a separate DC/DC converter, e.g., a charger. The controller 24 operates the inverter 22 to convert the DC power into regulated AC power and to provide the regulated AC power to a load coupled to the output 16.

When AC power provided to the input 12 is not acceptable, i.e., below an input power quality threshold, the controller 24 operates the UPS 10 in a backup mode of operation. In the backup mode of operation, DC power from the backup power source 14 is provided to the DC bus 20. The inverter 22 receives the DC power from the DC bus 20, and the controller 24 operates the inverter 22 to convert the DC power from the DC bus 20 into regulated AC power and to provide the regulated AC power to the output 16.

One or more batteries 14 may be provided to provide backup power to the UPS 10. The manner in which the batteries 14 are connected to the UPS is described as follows.

Figure 2:
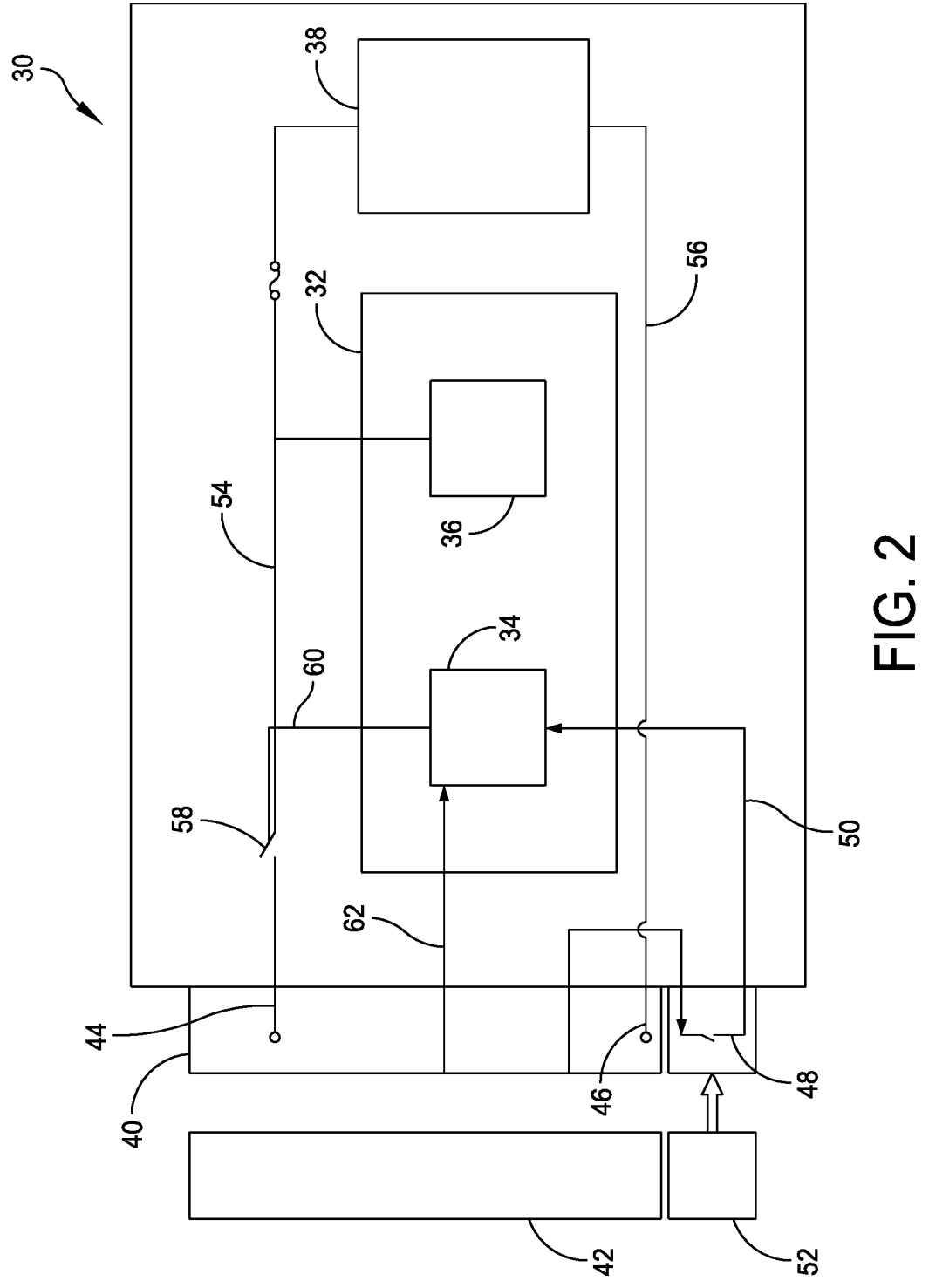
FIG. 2 is a block diagram of a battery module of an embodiment of the present disclosure.

Referring to FIG. 2, a battery module is generally indicated at 30. The battery module 30 is configured to provide power to an electronic device, such as UPS 10 described with reference to FIG. 1. The battery module 30 includes a battery management system 32 that has a microprocessor 34 to provide control functions and a logic power supply 36 to provide power to the microprocessor 34. As shown, the battery module 30 further includes lithium-ion battery cells 38 that is coupled to the logic power supply 36 of the battery management system 32. In one embodiment, the lithium-ion battery cells 38 provide power to the logic power supply 36 of the battery module 30. It should be noted that the logic power supply 36 can be powered by the lithium battery cells 38 or by an input to the battery module 30. It should be understood that the battery module 30 is capable of providing power to a load created by any type of electronic device, not just UPS 10.

In one embodiment, the microprocessor 34 is a computer processer having data processing logic and control included on a single integrated circuit (IC) or several ICs. The microprocessor 34 contains the arithmetic, logic, and control circuitry required to perform the functions of a central processing unit (CPU). The IC is capable of interpreting and executing instructions and performing required arithmetic operations. The microprocessor 34 is a multipurpose, clock-driven, register-based, digital IC that accepts binary data as input, processes the data according to instructions stored in memory, and provides results as output.

The battery module 30 further includes a connector 40 provided at one end of the battery module 30. The connector 40 is configured to releasably mate with an external system battery connector 42 of the electronic device. Specifically, the connector 40 includes a positive terminal 44 and a negative terminal 46, which are configured to connect with terminals provided in the electronic device to provide power from the battery module 30 to the electronic device. To prevent potential arcing and connector damage from occurring when the connector 40 of the battery module 30 is disconnected from the system battery connector 42 the electronic device, the battery module 30 further includes an EPO switch 48. The EPO switch 48 is connected to the microprocessor 34 by line 50. In one embodiment, the EPO switch 48 is part of the connector 40 and configured to be operated by a mechanical latch 52 associated with the system battery connector 42 of the electronic device when the system battery connector 42 is connected to and secured to the connector 40. The arrangement is such that when the system battery connector 42 of the electronic device is securely connected to the connector 40 of the battery module 30, the mechanical latch 52 may be operated to depress or otherwise engage the EPO switch 48, thereby moving the EPO switch from an OFF position to an ON position.

In the shown embodiment, the terminals 44, 46 of the battery connector are coupled to the lithium-ion battery cells 38 by buses 54, 56, respectively. As shown, when connecting the system battery connector 42 of the electronic device to the connector 40 of the battery module 30, the circuit is completed to provide power from the battery module to the electronic device. Bus 54 includes a power disconnect switch 58 to disconnect power from the battery 38 to the connector 40. The power disconnect switch 58 is further controlled by the microprocessor 34 through line 60. The power disconnect switch 58 is normally in an OFF position (open) thereby preventing the battery 38 from providing power to the electronic device.

As mentioned above, the EPO switch 48 is connected to the microprocessor 34 by line 50. Only when the EPO switch 48 is in an ON position, can the power disconnect switch 58 be switched from the OFF position to the ON position (closed) to provide power from the battery 38 to the electronic device. Specifically, the EPO switch 48 when depressed to the ON position, transmits a signal to the microprocessor 34, which in turn transmits a signal to the power disconnect switch 58 to condition the switch to the ON position. As shown, the connector 40 is connected to the microprocessor 34 by line 62 to provide further control and communication signals to the microprocessor 34 from the electronic device when coupling the connector 40 to the system battery connector 42.

During operation, when connecting the battery module 30 to the electronic device, the connector 40 of the battery module 30 and the mating system battery connector 42 are connected in the traditional manner. During this connection, the lithium-ion battery cells 38 are disconnected from the electronic device since the power disconnect switch 58 is in the OFF position. The operator must manipulate the mechanical latch 52 to depress or otherwise engage the EPO switch 48 thereby moving the EPO switch 48 from the OFF position to the ON position. As will be described in greater detail below, any type of mechanical latch 52 can be provided to achieve the activation of the EPO switch 48, including the device shown in FIGS. 4 and 5.

Once the EPO switch 48 is depressed by the mechanical latch 52, a signal is generated and transmitted to the microprocessor 34, which in turn generates and transmits a signal to the power disconnect switch 58 to move from the OFF position to the ON position. At this point, only after a secure connection between the connector 40 and the system mating connector 42 is achieved, can the lithium-ion battery cells 38 of the battery module 30 provide power to the electronic device.

When disconnecting the battery module 30 from the electronic device, the operator disengages the mechanical latch 52 from the EPO switch 48. The signal to the microprocessor 34 is terminated. As a result, the microprocessor 34 terminates the signal to the power disconnect switch 58 to move the power disconnect switch 58 from the ON position to the OFF position. Since the power disconnect switch 58 is in the OFF position, power from the battery 38 to the electronic device is cut off. At this point, the external system battery connector 42 of the electronic device can be safely disconnected from the connector 40 of the battery module 30. At this point, the power device 30 can be safely removed from the electronic device.

Thus, to disconnect and remove the battery 38 and prevent disconnect of the system battery connector 42 from occurring, the mechanical latch 52 is unlatched. The movement of the mechanical latch 52 to the unlatched position opens the EPO switch 48 and removes EPO signal, resulting in battery shutdown and opening of power disconnect switch 58 and stopping all discharge or charge current into battery 38 before user can physically pull the external battery system connector 42 from the connector 40. This results in mechanical disconnect of the battery 38 without any current to interrupt and prevents any potential arcing.

Figure 3:
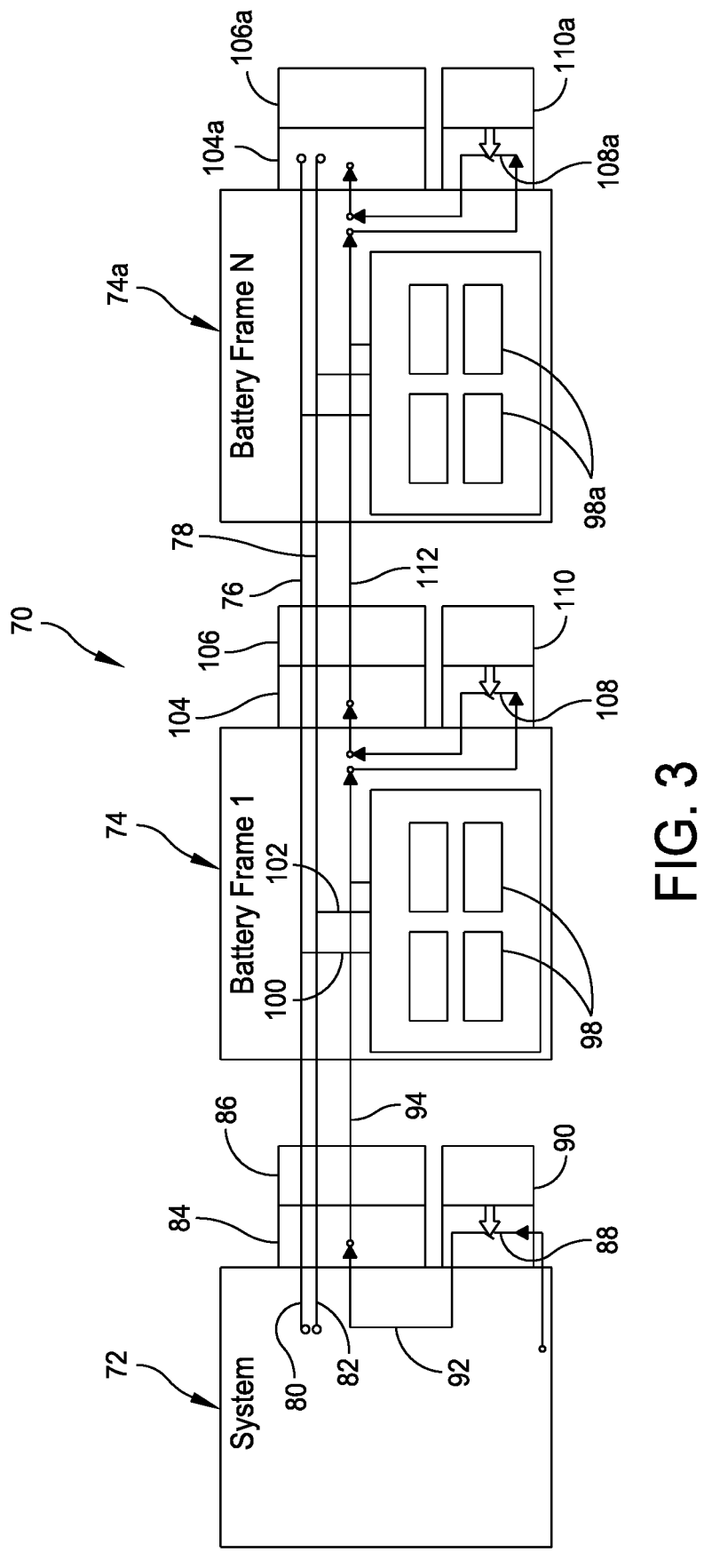
FIG. 3 is a block diagram of an assembly including a power system connected to several battery frames of an embodiment of the present disclosure.

Referring to FIG. 3, in one embodiment, an assembly, generally indicated at 70, includes a power system, generally indicated at 72, and several battery frames, each generally indicated 74, which are coupled to the power system. As shown in FIG. 3, the power system 72 of the assembly 70 is connected to the battery frames 74, which are positioned downstream from the power system 72. The power system 72 of the assembly 70 includes a power bus having positive and negative conduits 76, 78 that are connected to the battery frames 74, which are provided downstream from the power system 72. In the shown embodiment, the battery frames 74 are connected to the power system 72 in daisy chained parallel connection by the power bus.

The power system 72 includes a positive terminal 80 connected to positive bus 76 and a negative terminal 82 connected to negative bus 78. The power system 72 further includes a system connector 84 coupled to terminals 80, 82, which is configured to releasably mate with terminals of an external connector 86. The power system 72 further includes an EPO switch 88, which is configured to be operated by a mechanical latch 90 associated with the external connector 86. As will be discussed in greater detail below, the external connector 86 and the system connector 84 can be any type of suitable mating connectors, and the mechanical latch 90 may be selected to engage the EPO switch 88.

The power system 72 further includes an EPO terminal configured to receive an EPO signal from the EPO switch 88 when engaged by the mechanical latch 90 of the external connector 86. The EPO signal is configured to transmit along line 94 to the downstream battery frames 74.

When the external connector 86 is connected to the system connector 84 of the power system 72, and when the mechanical latch 90 is positioned to engage the EPO switch 88, the EPO switch 88 is configured to provide the EPO signal to the downstream battery frames 74. In this condition, the downstream battery frames 74 are coupled to the power system 72 to provide power from battery modules associated with the battery frames 74 to the power system 72. And when the mechanical latch 90 is manipulated to disengage the EPO switch 88, the EPO switch 88 is configured to terminate or otherwise change the EPO signal to the downstream battery frames 74. In this condition, the downstream battery frames 74 are decoupled from the power system 72 to either discontinue power from battery modules associated with the battery frames 74 to the power system 72 or to discontinue discharge. In some embodiments, the EPO signal can be terminated, voltage increased or decreased, or in some other manner changed.

Each battery frame 74 includes several battery modules, each indicated at 98. In the shown embodiment, the battery frame 74 includes four battery modules 98, each battery module 98 being similar to the battery module 30 shown and described in FIG. 2. The battery modules 98 are coupled to the power bus conduits 76, 78 by lines 100, 102 and provide power to the power system 72. As described above, when the external connector 86 is connected to the system connector 84 of the power system 72, and when the mechanical latch 90 is positioned to engage the EPO switch 88, the EPO switch is configured to provide an EPO signal to the downstream battery frames 74, thereby maintaining connection between the battery frame to the power system. When the mechanical latch 90 is manipulated to disengage the EPO switch 88, the EPO switch is configured to terminate or otherwise change the EPO signal to the downstream battery frames 74, thereby terminating connection between the downstream battery frames to the power system 72. The battery frame 74, in response to an EPO signal being discontinued or changed, is configured to disconnect the battery frame from the power system 72 thereby terminating power from the battery frame 74 to the power system 72.

Each battery frame 74 further includes a battery frame connector 104, which is configured to releasably mate with an external battery frame connector 106. The battery frame 74 further includes a battery frame EPO switch 108, which is configured to be operated by a mechanical latch 110 associated with the external battery frame connector 106. As noted, the battery frame connector 104 and the external battery frame connector 106 can be any type of suitable mating connectors, and the mechanical latch 110 may be selected to engage the battery frame EPO switch 108. The battery frame connector 104 of the battery frame 74 includes power terminals configured to mate power terminals with the external battery frame connector 106 and an EPO terminal configured to receive an EPO signal from the battery frame EPO switch 108 when engaged by the mechanical latch 110 of the external battery frame connector 106. The power terminal is configured to couple the battery frame 74 to the power bus. As shown, the EPO signal from the power system 72 is delivered to the battery frame EPO switch by line 94. The EPO signal from the battery frame EPO switch 108 travels to a downstream battery frame, e.g., battery frame 74a by line 112.

When the external battery frame connector 106 is connected to the battery frame connector 104 of the battery frame 74, and when the mechanical latch 110 is positioned to engage the battery frame EPO switch 108, the battery frame EPO switch is configured to provide an EPO signal to the downstream battery frames, e.g., battery frame 74a, by line 112. In this condition, the downstream battery frame 74a is coupled to the battery frame 74 to provide connection between battery modules 98a associated with the downstream battery frame 74a to the battery frame 74. And when the mechanical latch 110 is positioned to disengage the battery frame EPO switch 108, the battery frame EPO switch 108 is configured to terminate or otherwise change the EPO signal to the downstream battery frame 74a. In this condition, the downstream battery frame 74a is decoupled from the battery frame 74 and the power system 72 to discontinue connection between battery modules 98a associated with the downstream battery frame 74a of the assembly 70. In some embodiments, the EPO signal can be terminated, voltage increased or decreased, or in some other manner changed.

Any number of battery frames 74, 74a, etc. can be connected to the power system 72 of the assembly 70 by the power bus (lines 76, 78). Each additional battery frame, e.g., battery frame 74a, further includes an additional battery frame connector 104a configured to mate with an additional external battery frame connector 106a and an additional battery frame EPO switch 108a coupled to an additional battery frame EPO terminal. The additional battery frame EPO switch 108a is configured to be triggered by decoupling a mechanical latch 110a associated with the additional external battery frame connector 104a. The additional battery frame EPO terminal terminates a battery frame EPO signal when the additional battery frame EPO switch 108a is triggered to decouple batteries of downstream battery frames 74a from the external battery power terminal. In response to the additional battery frame EPO signal, the additional battery frame modules are configured to decouple to the additional external battery power terminal from the power source.

As mentioned above, the battery frame EPO switch 108 is coupled to the EPO switch 88 of the power system 72 by line 94. The EPO switch 88 of the power system 72 and the EPO switch 108 of the battery frames 74 are connected to one another in parallel, meaning that battery frames located downstream from a battery frame having its EPO switch in an OFF position will not provide power to the upstream equipment. For example, with reference to FIG. 3, when the EPO switch 108 for "Battery Frame 1" is in the OFF position (open), power from "Battery Frame N" and subsequent battery frames is cut off from the power system 72. Only when the EPO switches are in the ON positions (closed), can power be provided from the battery frames 74, 74a, etc. to the power system 72, which in turn provides power to the electronic device(s).

Thus, for each battery connection that connects groups of battery modules in the battery frame to other battery frames (frame connectors), the EPO switch and the mechanical latch for each connection must be secured to generate EPO signals to operate the assembly. When the frame connector is engaged and securely connected to its system battery connector, the user closes the latch as previously described to mechanically secure the battery in place and to depress the switch to generate the EPO signal thereby providing a connection between the battery frame and the power system. The mechanical latch prevents physical removing of the frame connector until the mechanical latch is removed and EPO switch in the frame connector is opened.

During removal of the battery or the group of batteries in the battery frame or the group of battery frames, the user releases the mechanical latch, which terminates the EPO signal from all batteries that may be mechanically disconnected. All of the batteries may open their power disconnects before the user can unplug main frame disconnect, resulting always in opening of large frame connector with zero (0) current. Also, batteries that are about to be shutdown are turned off, while the rest of the batteries that will remain in the system continue to operate normally.

In another embodiment, each battery frame 74, 74a, etc. may be configured to include a microprocessor. In such an embodiment, the microprocessor is coupled to the EPO switch 88 of the power system 72 by line 94. The microprocessor of the battery frame 74, 74a, etc., in response to an EPO signal being discontinued or changed, is configured to control a switch, such as power disconnect switch 58, to disconnect the downstream battery frames from the battery frame.

In another embodiment, the power bus (lines 76, 78) may be configured to include a switch, similar to power disconnect switch 58, to disconnect downstream battery frames 74, 74a, etc. from the external battery frame terminal. In a certain embodiment, the switch is normally in an ON position thereby enabling the downstream battery frames 74, 74a, etc. to provide power to the external power terminal and to enable discharge of power. For example, when the battery frame EPO switch 108 is moved from an ON position to an OFF position by decoupling the mechanical latch 110 from the battery frame EPO switch, the EPO signal is terminated or otherwise changed thereby causing the microprocessor to deactivate the switch to cut off power provided from the downstream battery frames. In a particular embodiment, the mechanical latch 110 is configured to be extended to engage the battery frame EPO switch 108 to achieve an ON position and retracted to disengage the battery frame EPO switch to achieve an OFF position.

In one embodiment, a battery module is provided to include a microprocessor coupled to an emergency power off (EPO) terminal. In one embodiment, the battery module may be a battery module associated with battery frame 74. The battery module is configured to receive an EPO signal from an upstream device coupled to an EPO switch and the microprocessor is configured to control a switch to decouple one or more batteries of the battery module from the upstream device upon a change in the EPO signal. In a certain embodiment, the upstream device is coupled to an external-battery-power terminal, which is configured to receive an external battery-power connector. The external-battery-power terminal is part of a battery-power connector and is configured to releasably mate with the external battery-power connector. The external-battery-power terminal includes a positive terminal and a negative terminal, which are configured to connect with terminals provided in the battery-power connector, with the one or more batteries being coupled to the external-battery-power terminal. The battery-power connector and the external battery-power connector can be configured to include other control and communication signals, in addition to the power and EPO signal.

The arrangement is such that the microprocessor, in response to a change in the EPO signal, is configured control the switch to decouple the battery from the external-battery-power terminal. The EPO switch is configured to be moved from an ON position to an OFF position by a mechanical latch to terminate the EPO signal to the microprocessor. In one embodiment, the battery module further includes a logic power supply coupled to the external-battery-power terminal, with the logic power supply being configured to supply power to the microprocessor.

Figure 4:
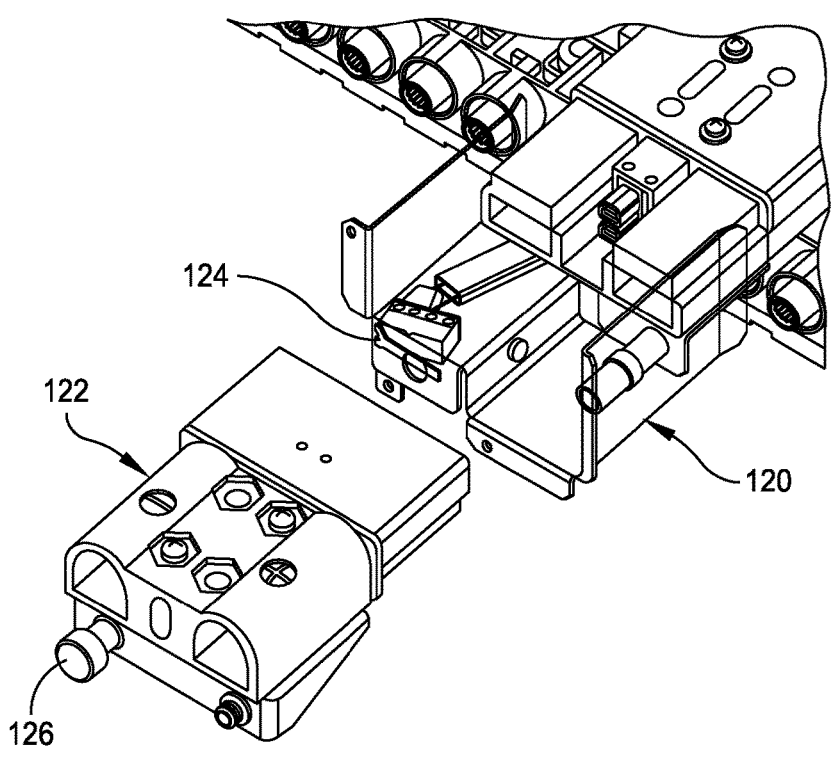
FIG. 4 is a perspective view of a system battery connector prior to being inserted into a connector of the power system.
Figure 5:
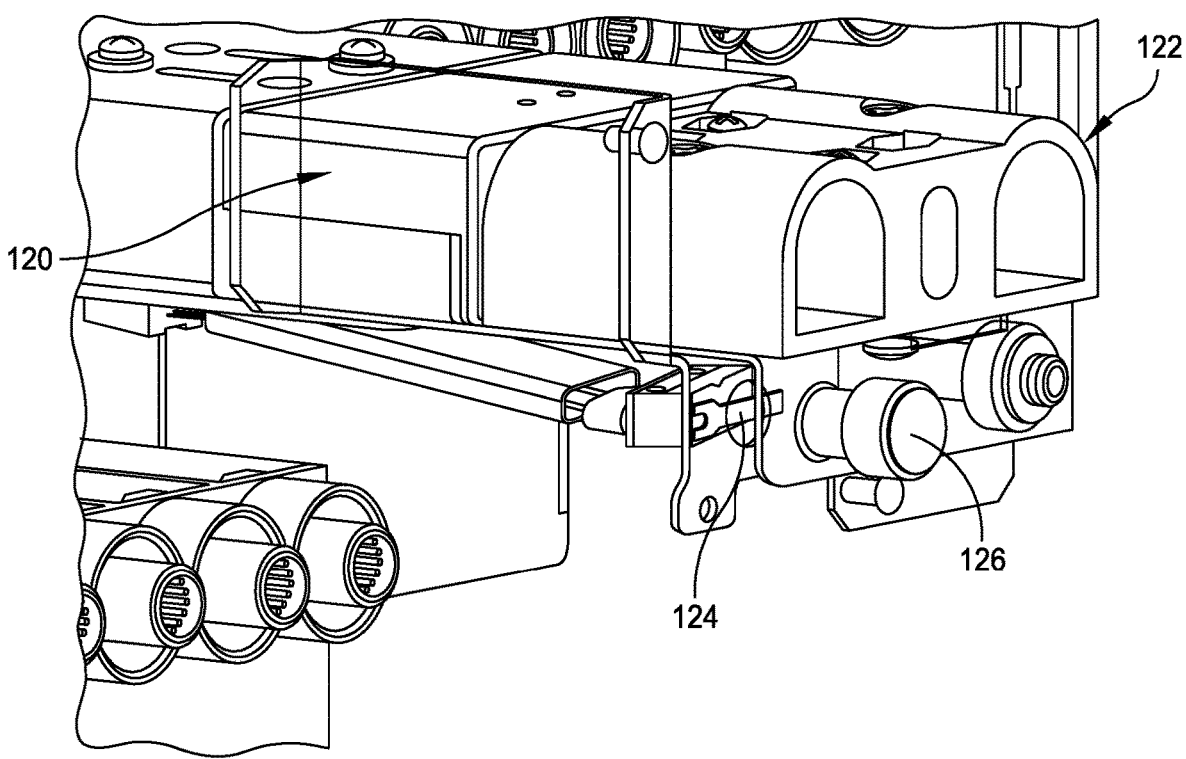
FIG. 5 is an enlarged perspective view of the system battery connector connected to the connector of the power system.

Referring to FIGS. 4 and 5, an example of a system battery connector, generally indicated at 120 and an external connector, generally indicated at 122, is shown. The system battery connector 120 and the external connector 122 may embody any suitable electrical connector, such as Anderson connectors, capable of delivering power from the batteries to the electronic device. The type of connector shown in FIGS. 4 and 5 is a suitable high-power DC connector. As shown, the system battery connector 120 includes a switch 124, such as the EPO switch described above, which is normally in the OFF position. By depressing or otherwise engaging the EPO switch, the status of the EPO switch changes from the OFF position to the ON position. The external connector 122 includes a mechanical latch 126 that is configured to depress or otherwise engage the EPO switch 124 once the external connector is firmly secured to the battery system connector, thereby connecting the electronic device to the power system and/or the battery frames and/or battery modules. In one embodiment, the mechanical latch 126 includes a hand actuated fastener that is configured to be extended and retracted in the traditional manner. In operation, to depress the EPO switch 124, the user rotates the hand actuated fastener 126 to extend the fastener so that it engages the EPO switch 124.

Once sufficiently extended, the EPO switch 124 is depressed thereby achieving the ON position. As noted above, an EPO signal is generated to the microprocessor of the power system and/or battery frame, which then generates a signal to the power disconnect switch, thereby moving the power disconnect switch from its normal OFF position to the ON position. Once this happens, power from the battery or batteries is provided to the load.

Various controllers, such as the microprocessors 34, 96, may execute various operations discussed above. Using data stored in associated memory and/or storage, the controller also executes one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Embodiments of the present disclosure are directed to a power system with an emergency power off (EPO) terminal, an EPO switch, and an external battery power terminal configured to receive an external battery power connector. The EPO switch is triggered when the connector is disconnected, thereby causing the EPO terminal to transmit an EPO signal.

In some embodiments, a mechanism to disconnect an external battery power cable from a power system, such as a UPS, may require an EPO switch to be depressed at least a few milliseconds before the connector can be disconnected.

In some embodiments, depressing the EPO switch may cause all downstream batteries to stop drawing or supplying current.

In some embodiments, during a delay between depressing the EPO switch and the disconnection of the power cable, current through the cable may drop to zero.

In some embodiments, a "normally ON position" is described as a closed circuit in which the switch is normally on during operation. For example, when the power disconnect switch is described as being in a "normally ON position," the power disconnect switch is closed, allows flow of electrical current, and the EPO switch is present. It should be understood that the system can be configured to be "normally OFF position" and fall within the scope of the present disclosure.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only.

What is claimed is:

1. A power system, comprising:
an external-battery-power terminal configured to receive an external-battery-power connector;
an external battery emergency power off (EPO) terminal; and
an EPO switch coupled to the EPO terminal, the EPO switch being configured to:
transmit, based at least in part on the EPO switch being closed, an EPO signal configured to facilitate a current flow between a battery and the external-battery-power terminal; and
terminate, based at least in part on the EPO switch being opened by decoupling a mechanical latch associated with the external-battery-power connector, transmission of the EPO signal, wherein terminating the transmission of the EPO signal triggers termination of the current flow between the battery and the external-battery-power terminal.

2. The power system of claim 1, wherein the battery is a lithium-ion battery.

3. The power system of claim 1, further comprising:
a power disconnect switch that couples the external-battery-power terminal to the battery or decouples the external-battery-power terminal from the battery based at least in part on a status of the power disconnect switch; and
at least one processor configured to control the status of the power disconnect switch to couple or decouple the battery from the external-battery-power terminal, wherein the external-battery-power terminal is coupled to the battery based at least in part on the power disconnect switch being closed or is decoupled from the battery based at least in part on the power disconnect switch being open.

4. The power system of claim 3, wherein to control the status of the power disconnect switch, the at least one processor is configured to:

close, in response to the EPO signal, the power disconnect switch to couple the battery to the external-battery-power terminal and to cause the current flow between the battery and the external-battery-power terminal; and open, in response to failing to receive the EPO signal, the power disconnect switch to decouple the battery from the external-battery-power terminal and to cause the termination of the current flow between the battery and the external-battery-power terminal.

5. The power system of claim 1, wherein the external-battery-power terminal is part of a battery-power connector and is configured to releasably mate with the external-battery-power connector.

6. The power system of claim 5, wherein the external-battery-power terminal includes a positive terminal and a negative terminal configured to connect with terminals in the battery-power connector to provide power to a device.

7. The power system of claim 1, further comprising a power disconnect switch that couples the external-battery-power terminal to the battery or decouples the external-battery-power terminal from the battery based at least in part on a status of the power disconnect switch, wherein the external-battery-power terminal is coupled to the battery by at least one power bus, and wherein the at least one power bus is coupled to the power disconnect switch.

8. The power system of claim 1, wherein the mechanical latch includes a hand actuated fastener configured to be extended to engage the EPO switch to achieve a closed status and retracted to disengage the EPO switch to achieve an open status, and wherein the closed status corresponds to an ON position and the open status corresponds to an OFF position.

9. The power system of claim 1, further comprising:

a battery frame EPO terminal coupled to the EPO terminal; and one or more battery frames coupled to the external-battery-power terminal and configured to provide additional power to the power system, wherein the one or more battery frames include respective battery frame connectors configured to mate with respective external-battery-frame-power connectors, and wherein the one or more battery frames include respective battery frame EPO switches coupled to the battery frame EPO terminal.

10. The power system of claim 9, wherein the respective battery frame EPO switches are configured to be triggered by decoupling an additional mechanical latch associated with the respective external-battery-frame-power connectors.

11. The power system of claim 10, wherein the battery frame EPO terminal terminates a battery frame EPO signal in response to a battery frame EPO switch of the respective battery frame EPO switches being triggered to decouple an additional battery associated with a battery frame of the one or more battery frames from the external-battery-power terminal.

12. The power system of claim 11, wherein the battery frame EPO terminal is configured to couple or decouple the battery frame from the external-battery-power terminal based at least in part on a status of the battery frame EPO switch.

13. The power system of claim 1, wherein the external-battery-power terminal and the EPO terminal are part of a battery power connector.

14. A non-transitory computer-readable medium storing instructions that, when executed by a controller, cause the controller to perform a method comprising:

receiving, based at least in part on an emergency power off (EPO) switch being in a closed status, an EPO signal configured to facilitate current flow between a battery and an external-battery-power terminal, wherein the external-battery-power terminal is part of a battery-power connector and is configured to releasably mate with an external-battery-power connector;

detecting a change in status of the EPO switch from the closed status to an open status based at least in part on failing to receive the EPO signal, wherein the change in status of the EPO switch is based at least in part on decoupling a mechanical latch associated with the external-battery-power connector; and triggering, based at least in part on the change in status of the EPO switch, termination of the current flow between the battery and the external-battery-power terminal.

15. The non-transitory computer-readable medium of claim 14, wherein the method further comprises controlling a status of a power disconnect switch to couple the battery to the external-battery-power terminal or to decouple the battery from the external-battery-power terminal, and wherein the EPO switch is different from the power disconnect switch.

16. The non-transitory computer-readable medium of claim 15, wherein controlling the status of the power disconnect switch comprises:

closing, in response to the EPO signal, the power disconnect switch to couple the battery to the external-battery-power terminal and to cause the current flow between the battery and the external-battery-power terminal; and opening, based at least in part on the change in status of the EPO switch, the power disconnect switch to decouple the battery from the external-battery-power terminal and to cause the termination of the current flow between the battery and the external-battery-power terminal.

17. The non-transitory computer-readable medium of claim 14, wherein the external-battery-power terminal includes a positive terminal and a negative terminal configured to connect with terminals in the battery-power connector to provide power to an additional device.

18. The non-transitory computer-readable medium of claim 14, wherein decoupling the mechanical latch terminates the EPO signal.

19. A device, comprising:

at least one memory; and at least one processor coupled with the at least one memory and operable to cause the device to:

receive, based at least in part on an emergency power off (EPO) switch being in a closed status, an EPO signal configured to facilitate current flow between a battery and an external-battery-power terminal, wherein the external-battery-power terminal is part of a battery-power connector and is configured to releasably mate with an external-battery-power connector;

detect a change in status of the EPO switch from the closed status to an open status based at least in part on failing to receive the EPO signal, wherein the change in status of the EPO switch is based at least in part on decoupling a mechanical latch associated with the external-battery-power connector; and trigger, based at least in part on the change in status of the EPO switch, termination of the current flow between the battery and the external-battery-power terminal.

20. The device of claim 19, wherein the at least one processor is further operable to cause the device to control a status of a power disconnect switch to couple the battery to the external-battery-power terminal or to decouple the battery from the external-battery-power terminal, wherein the EPO switch is different from the power disconnect switch.

21. The device of claim 20, wherein to control the status of the power disconnect switch, the at least one processor is operable to cause the device to:

close, in response to the EPO signal, the power disconnect switch to couple the battery to the external-battery-power terminal and to cause the current flow between the battery and the external-battery-power terminal; and open, based at least in part on the change in status of the EPO switch, the power disconnect switch to decouple the battery from the external-battery-power terminal and to cause the termination of the current flow between the battery and the external-battery-power terminal.

22. The device of claim 19, wherein the external-battery-power terminal includes a positive terminal and a negative terminal configured to connect with terminals in the battery-power connector to provide power to an additional device.

23. The device of claim 19, wherein decoupling the mechanical latch terminates the EPO signal.

* * * * *